United States Patent

Yates

[11] Patent Number: 5,774,966
[45] Date of Patent: Jul. 7, 1998

[54] FABRIC ARTICLE AND METHOD OF MANUFACTURE

[76] Inventor: Paul M. Yates, 5814 Briar Tree Dr., LaCanada, Calif. 91011

[21] Appl. No.: 733,027

[22] Filed: Oct. 16, 1996

[51] Int. Cl.[6] ............................. B68G 7/00; B25B 27/14
[52] U.S. Cl. ........................ 29/91.5; 29/91.1; 29/273
[58] Field of Search ........................ 29/91.5, 91.1; 264/156, 273, 257

[56] References Cited

U.S. PATENT DOCUMENTS

| | | | |
|---|---|---|---|
| 4,829,644 | 5/1989 | Kondo et al. | 29/91.1 |
| 4,831,697 | 5/1989 | Urai | 29/91.1 |
| 4,860,415 | 8/1989 | Witzke | 29/91.1 |
| 5,034,076 | 7/1991 | Masui et al. | 264/273 |
| 5,250,250 | 10/1993 | Gorski | 264/273 |
| 5,486,329 | 1/1996 | Ueki et al. | |

*Primary Examiner*—David P. Bryant
*Assistant Examiner*—Tisa L. Stewart
*Attorney, Agent, or Firm*—Walter A. Hackler

[57] ABSTRACT

A method of attaching a plastic material to a fabric for decorative and/or protective purposes and upholstering a form includes the step of forming a pressure plate having concavities on one side thereof disposed in a selected pattern, said selected pattern corresponding to a desired pattern of application of the plastic material on a fabric and providing fluid communication between each concavity on another side of said pressure plate and a supply of fluid plastic material. The fabric is disposed on a bed and the pressure plate is against the fabric and bed to form a seal between the concavities. Thereafter fluid plastic material is forced through the concavities and into portions of the fabric disposed under each concavity to form the desired pattern on the fabric. The fluid plastic material is allowed to harden and thereafter the pressure plate is separated from the fabric leaving hardened plastic embedded in said selected pattern on said fabric. The fabric may then be stretched over a form to provide for an upholstered item.

14 Claims, 2 Drawing Sheets

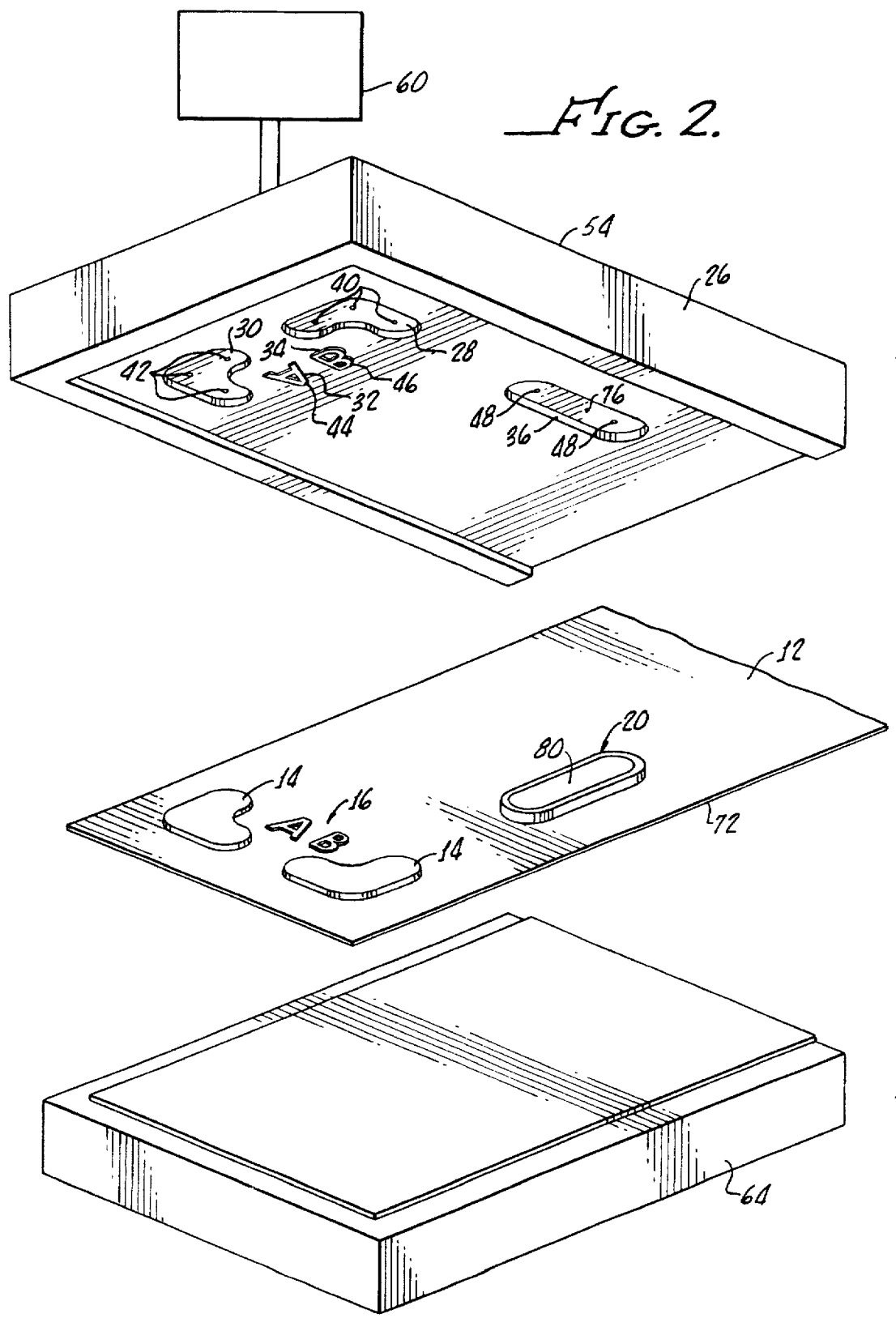

FABRIC ARTICLE AND METHOD OF MANUFACTURE

The present invention is generally related to a fabric article and is more particularly directed to a method for attaching a plastic material to a fabric for decorative and/or protective purposes. Most upholstered items utilize a fabric covering for decorative and protective purposes. These articles include cushions, arm rests, head rests, handles, among other articles as may be found in automobiles as well as in home environments.

These articles are manufactured and most often utilize materials of different colors sewn together in order to provide for a colored pattern on the finished product.

In addition, it is often desirable to provide corporate logos, or trademarks identifying or advertising the product. Customarily such insignia are attached to the fabric by sewing and have proven serviceable in that regard.

Unfortunately, the cost of such sewing or embroidery and the time and labor required for the procedure is inherently expensive.

Various other transfer type labels or decorations such as decals or printing have also been utilized, however, these separate procedures are also expensive and because of their superficial application, do not hold up under extensive wear conditions in which the fabric may be rubbed or brushed during use.

Accordingly, the use of plastic materials in the direct application of decorative and/or protective coatings and designs on the fabric would be very desirable since a great deal of manufacturing steps can be eliminated.

The present invention defines a new and improved method of attaching plastic material to a fabric.

SUMMARY OF THE INVENTION

A method of attaching a plastic material to a fabric in accordance with the present invention generally includes the steps of forming a pressure plate having concavities on one side thereof disposed in a selective pattern with the selected pattern corresponding to a desired pattern of the application plastic material on a fabric. Fluid communication is provided between each concavity an opposite side of the pressure plate and a supply of fluid plastic material. In this manner, the fluid plastic material can be delivered simultaneously from a supply to each of the concavities.

A fabric is disposed on a bed and the pressure plate is forced thereagainst to form a seal between the concavities. The fluid plastic material is then forced through the concavities and into portions of the fabric disposed under each concavity to form the desired pattern on the fabric.

Subsequently, the fluid plastic material is allowed to harden and the pressure plate is separated from the fabric leaving hardened plastic embedded in said selected pattern fabric.

More particularly, in accordance with the present invention, fabric may be punctured in portions thereof under at least one of the concavities to enable the fluid plastic to flow therethrough to an opposite side of the fabric. In this manner the plastic material spreading on an opposite side of the fabric enhances the attachment of the plastic to the fabric. This is particularly advantageous if a non-porous fabric is utilized such as a leather, or the like.

In one embodiment of the present invention, concavities may be formed in the bed corresponding to at least one of the concavities and the pressure plate and aligned therewith and puncture in the fabric to enable the formation of plastic material on both sides of the fabric.

Still more particularly, at least one of the concavities may be formed in the pressure plate with a pattern providing a legible script of hardened plastic on the fabric. In addition, one of the concavities may be formed in the pressure plate with sufficient depth to provide hardened plastic of sufficient thickness on the fabric to enable fastening thereto by a screw or the like.

A method in accordance with the present invention of upholstering a form of the like generally includes the steps of providing a form and cutting the fabric to the size and shape suitable for covering the form.

A pressure plate is formed having concavities on one side thereof and disposed in a selected pattern with a selected pattern corresponding to a desired pattern of application of plastic material on the cut fabric.

As hereinabove the noted fluid communication within the concavities is provided on another side of the pressure plate and a supply of fluid plastic material. Cut fabric is disposed on the bed and the pressure plate forced there against to form a seal between the concavities.

Forcing fluid plastic material through the concavities in inner portions of the cut fabric disposed under each of the concavities is then executed to form the desired pattern on the cut fabric.

After allowing the fluid plastic material to harden, the pressure plate is separated from the cut fabric leading the hardened plastic embedded in the selected pattern on the cut fabric.

Thereafter, the cut embedded fabric is stretched over the form and a perimeter of the stretched fabric is secured to an underside of the form.

More particularly, the concavities may be formed in the pressure plate in the pattern proximate a perimeter of the cut fabric. In this instance the fluid plastic material hardens to a flexible plastic and a step of stretching the cut embedded fabric over the form includes aligning the flexible plastic along an edge of the form to form a barrier for abrasion of the cut fabric stretched over the form edge.

BRIEF DESCRIPTION OF THE DRAWINGS

The advantages and features of the present invention will be better understood by the following description when considered in conjunction with the accompanying drawings in which:

FIG. 2 is an exploded perspective view of a pressure plate and bed suitable for use in the method of the present invention for providing a plastic pattern on fabric or the like;

DETAILED DESCRIPTION

Figure 1:
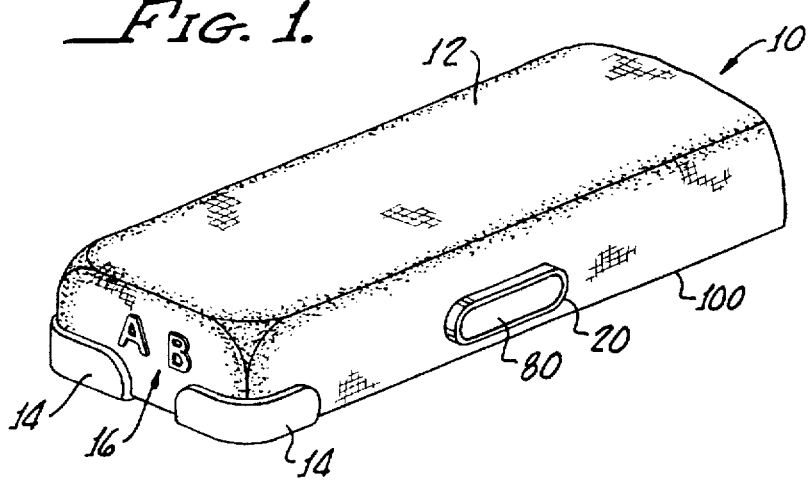
FIG. 1 is perspective view of a seat, or chair, arm upholstered in accordance with the method of the present invention.

Turning now to FIG. 1, there is shown a finished arm 10 having a fabric 12 disposed thereon with protective shields 14, a logo 16 formed in the fabric in legible script as well as a fixture 20 embedded in the fabric 12 of the arm 10 which is suitable for the insertion of an accessory, for example, a pencil holding clip, or removable ash tray, not shown.

In FIG. 2 there is shown a pressure plate 26 formed in accordance with the method of the present invention which includes a number of concavities 28, 30, 32, 34, 36 therein which are disposed in a selected pattern. The selected pattern corresponds to a desired pattern of plastic material to the fabric 12. It should be appreciated that the pressure plate 26 may be formed from any suitable material, such as metal or the like, and the concavities formed therein in a conventional manner. Feed apertures 40, 42, 44, 46, 48 provide fluid communication from one side 52 of the pressure plate 26 to an opposite side 54 and are interconnected to a supply 60 of fluid plastic through the inner connected channels 62, or the like. (See FIG. 3) disposed on the opposite side 54 of the pressure plate 26. In this manner fluid plastic material, such as, for example, heated thermoplastic material may be forced from the supply into each of the concavities 28, 30, 32, 34, 36, see also FIG. 3.

Figure 3:
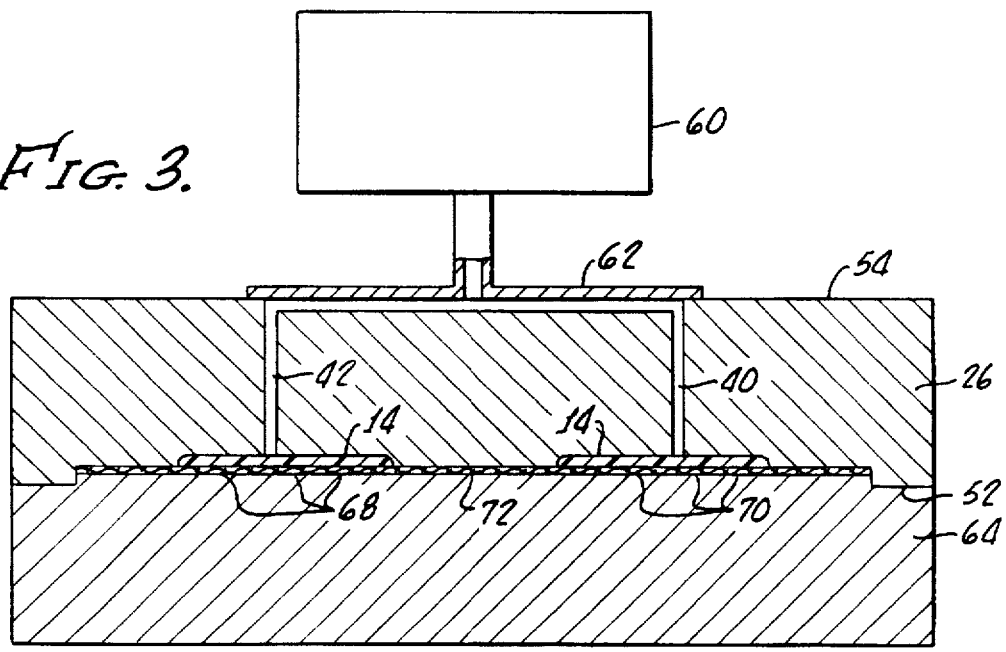
FIG. 3 is a cross sectional view of the pressure plate fabric and head when disposed for embedding plastic material onto the fabric.

In accordance with the present invention, the pressure plate 26 is forced against a suitable bed or flat surface 64 with fabric 12 therebetween as shown in FIG. 3. The bed may be of any suitable rigid material for enabling the pressure plate to press the fabric there against and against the one side 52 of the pressure plate in order to form a seal between the concavities 28, 30, 32, 34, 36 to prevent unwanted disposition of plastic material on the fabric.

After the seal is established, fluid plastic is forced into the cavities 28, 30, 32, 34, 36 by way of the connectors 62 from the supply 60 and the plastic is embedded into the fabric 12. It should be appreciated that when the fabric is stretchable, for example, Lycra®, or Kevlar® the plastic may be embedded directly into the nap of the fabric.

Alternatively, if a smooth fabric such as a vinyl or leather is utilized, small pinholes 68 and 70 may be provided in the fabric under at least one concavity 28 to enable the fluid plastic to flow through the fabric 12 to an opposite side 72 in order to fasten the plastic thereto. Also, if a plastic film is used instead of a cloth fabric, direct bonding to the film can be accomplished with the proper selection of materials.

It should be appreciated that any suitable hardening plastic material may be utilized and when the plastic has a color different from that of the fabric, the plastic may be applied only at a minimum thickness to prevent seeing the fabric color through the coated plastic. In this manner, various designs may be disposed on the fabric and concavities for logos 34, 36 may be very shallow to apply the script pattern logo 16. For example, the applied plastic may be as thin as 0.05 inches.

Alternatively, concavity 36 may be formed in a pressure plate 26 with sufficient depth to provide hardened plastic 20 of sufficient thickness, for example up to about 0.5 inches, or more, to enable fastening to by a screw or the like. In addition, the concavity 36 may include a mold 76 to provide the hardened plastic 20 with a cavity 80 enabling the insertion of a pencil holding clip, or the like (not shown).

Alternatively, the formed plastic 20 may be manually drilled to provide the cavity 80 for the insertion of pencil holding clip (not shown).

Figure 4:
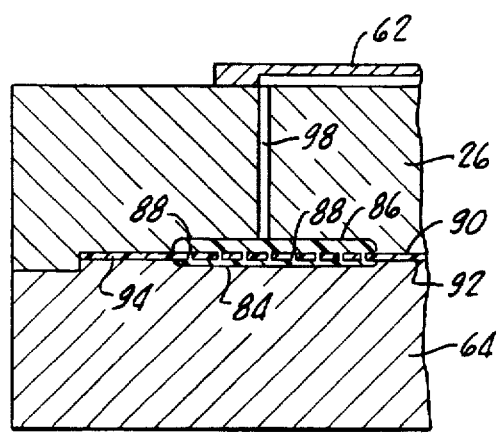
FIG. 4 is an exploded perspective view showing another embodiment of the present in which the method provides for disposing plastic on both sides of a fabric.

Turning to FIG. 4, the bed 64 may include a concavity 84 corresponding to a concavity 86 formed in the pressure plate 26 and aligned therewith and punctures 88 in the fabric 12 to enable the formation of plastic material on both sides 90, 92 of a fabric 94. It should be appreciated that support ribs 96 may be formed in the bed 64 and disposed adjacent the punctures 88 in order to prevent the fabric 94 from being forced against the bed 64 during filing of the concavities 84, 86 with fluid plastic through an aperture 98.

As hereinabove noted, when suitable plastic material is utilized, the resulted hardened plastic is flexible and thus can be stretched around a perimeter 100 of the form 84 to form the curved protective bumpers 14 as shown in FIG. 1. Thus, all of the protective ornamentation elements and in fact color pattern of the arm 10 may be formed by the hereinabove described method in a single step and without additional steps of sewing and applying various elements to the fabric 12 during the manufacturing process.

Although there has been hereinabove described a method of attaching plastic to a fabric as well as a method of upholstering a form in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A method of attaching a plastic material to a fabric for decorative and/or protective purposes, said method comprising the steps of:

forming a pressure plate having concavities on one side thereof wherein said concavities are disposed in a selected pattern;

providing fluid communication between each said concavity and an opposite side of said pressure plate;

disposing the fabric on a bed;

forcing said pressure plate against the fabric and bed to form a seal between the said concavities;

forcing fluid plastic material through the concavities and into the fabric disposed under each concavity to form a plastic pattern on the fabric;

allowing the fluid plastic material to harden; and separating the pressure plate from the fabric leaving hardened plastic embedded in said fabric.

2. The method according to claim 1 further comprising the step of puncturing said fabric under at least one of the concavity to enable the fluid plastic to flow therethrough to an opposite side of said fabric.

3. The method according to claim 2 further comprising the steps of forming a concavity in said bed corresponding to at least one of the concavities in said pressure plate and aligning at least one of the pressure plate concavities with the puncture in said fabric to enable the formation of plastic material on both sides of said fabric.

4. The method according to claim 1 wherein at least one of the concavities is formed in said pressure plate in a pattern for providing a legible script of hardened plastic on said fabric.

5. The method according to claim 1 wherein at least one of the concavities is formed in said pressure plate with sufficient depth to provide hardened plastic of sufficient thickness on said fabric to enable fastening thereto by a screw or the like.

6. The method according to claim 1 wherein the step of forcing fluid plastic material includes forcing a fluid plastic material of at least one different color than a color of said fabric.

7. The method according to claim 6 further comprises the step of heating a thermoplastic material to form the fluid plastic material and the step of allowing the fluid plastic material to harden includes allowing the fluid plastic material to cool.

8. A method of upholstering a form, said method comprising the steps of:

providing a form;

cutting a fabric to a size and shape suitable for covering the form;

forming a pressure plate having concavities on one side thereof disposed in a selected pattern, said selected pattern corresponding to a desired pattern;

providing fluid communication between each concavity and an opposite side of said pressure plate;

disposing the cut fabric on a bed;

forcing said pressure plate against the cut fabric and bed to form a seal between the concavities;

forcing fluid plastic material through the concavities and into the cut fabric disposed under each concavity to form the desired pattern on the cut fabric;

allowing the fluid plastic material to harden;

separating the pressure plate from the cut fabric leaving hardened plastic embedded in said selected pattern on said cut fabric;

stretching the cut embedded fabric over said form;

securing the stretched cut embedded fabric to said form.

9. The method according to claim 8 wherein the fluid plastic material hardens to a flexible plastic and the step of stretching the cut embedded fabric over said form includes aligning the flexible plastic along an edge of said form to form a barrier for abrasion of the cut fabric stretched over the form edge.

10. The method according to claim 8 wherein at least one of the concavities is formed in said pressure plate in a pattern for providing a legible script of hardened plastic on said cut fabric.

11. The method according to claim 8 wherein at least one of the concavities is formed in said pressure plate with sufficient depth to provide hardened plastic of sufficient thickness on said cut fabric to enable fastening thereto by a screw.

12. The method according to claim 8 further comprising the step of puncturing said fabric in the portions thereof under at least one concavity to enable the fluid plastic to flow therethrough to an opposite side of said fabric.

13. The method according to claim 12 wherein at least one of the concavities is formed in said pressure plate with sufficient depth to provide hardened plastic on said cut fabric to enable fastening thereto by screws or the like.

14. A method of attaching a plastic material to a fabric for decorative and/or protective purposes, said method comprising the steps of:

forming a pressure plate having concavities on one side thereof disposed in a selected pattern;

disposing the fabric on a bed;

forcing said pressure plate against the fabric and bed to form a seal between the concavities;

forcing fluid plastic material through the concavities and into the fabric disposed under each concavity to form a plastic pattern on the fabric;

allowing the fluid plastic material to harden; and separating the pressure plate from the fabric, leaving hardened plastic embedded in the fabric.

* * * * *

UNITED STATES PATENT AND TRADEMARK OFFICE
CERTIFICATE OF CORRRECTION

PATENT NO. : 5,774,966
DATED : July 7, 1998
INVENTOR(S) : Paul M. Yates It is certified that error appears in the above-identified patent and that said Letters Patent is hereby corrected as shown below:

Title page, under item [56], References Cited, insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | | 9 | 6 | 6 | 3 | 7 | 2 | 8/10 | Weiss | | | |
| | | 3 | 9 | 4 | 1 | 6 | 3 | 6 | 3/76 | Prout et al | | | |
| | | 5 | 5 | 1 | 4 | 3 | 1 | 8 | 5/96 | Petenon | | | |
| | | 5 | 5 | 8 | 9 | 1 | 2 | 1 | 12/96 | Inagaki et al | | | |
| | | 5 | 5 | 9 | 9 | 6 | 0 | 8 | 2/97 | Yamamojo et al | | | |
| | | | | | | | | | | | | |

Signed and Sealed this

Ninth Day of March, 1999

Attest:

Attesting Officer

Q. TODD DICKINSON

Acting Commissioner of Patents and Trademarks